(12) United States Patent
Ronald (10) Patent No.: US 8,390,225 B2
(45) Date of Patent: Mar. 5, 2013

(54) PHOTON MOTOR CONTROL (75) Inventor: Timothy R. Ronald, Clarence, NY (US)

(73) Assignee: Ronald Medical Ltd., Clarence, NY (US)

( * ) Notice: Subject to any disclaimer, the term of this patent is extended or adjusted under 35 U.S.C. 154(b) by 464 days.

(21) Appl. No.: 12/797,691

(22) Filed: Jun. 10, 2010

(65) Prior Publication Data
US 2010/0315028 A1    Dec. 16, 2010

Related U.S. Application Data (60) Provisional application No. 61/268,448, filed on Jun. 13, 2009.

(51) Int. Cl.
H02K 29/10 (2006.01)

(52) U.S. Cl. ........... 318/400.4; 318/400.01; 318/400.37; 318/700; 310/68 B (58) Field of Classification Search ............. 318/400.01, 318/400.37, 400.4, 700; 310/68 B
See application file for complete search history.

(56) References Cited

U.S. PATENT DOCUMENTS

| 4,361,789 | A | * | 11/1982 | Faulhaber | 388/822 |
| 4,684,857 | A | * | 8/1987 | Llopis | 318/400.4 |
| 5,059,876 | A | * | 10/1991 | Shah | 318/400.09 |
| 6,049,187 | A | * | 4/2000 | Haner | 318/725 |
| 7,417,390 | B2 | * | 8/2008 | Getz et al. | 318/400.01 |

OTHER PUBLICATIONS

"Transcutaneous Energy Transfer System for Powering Implantable Biomedical Devices" Chwee Teck Lim , James C.H. Goh (Eds): ICBME 2008, Proceedings 23, pp. 235-239, 2009 www.springerlink.com.*

* cited by examiner

Primary Examiner — Kawing Chan
(74) Attorney, Agent, or Firm — Roach Brown McCarthy & Gruber, P.C.; Kevin D. McCarthy (57) ABSTRACT A motor having an alternating current electrical source, a light power circuitry, a stationary transcutaneous energy transmission coil spaced from a rotatable transcutaneous energy transmission coil, a plurality of phototransistor arrays positioned on a rotatable platform and each phototransistor array corresponds to and rotates in conjunction with an armature winding used in the motor. Each phototransistor array (i) receives an alternating current from the rotatable transcutaneous energy transmission coil, and (ii) charges (a) each armature winding to a constant high voltage when the motor is operating and (b) each phototransistor/MOSFET power source to a desired power level. When the light from the light power circuitry contacts a phototransmitter, the phototransistor array is turned on so the armature winding associated with that phototransmitter generates an instantaneous maximum magnetic field.

6 Claims, 10 Drawing Sheets

PHOTON MOTOR CONTROL

RIGHT OF PRIORITY

This application claims priority to U.S. provisional patent application Ser. No. 61/268,448; filed on Jun. 13, 2009.

BACKGROUND OF THE INVENTION

In U.S. Pat. No. 7,417,390; Getz et al. wrote, "Brushless direct current (DC) motors typically include electronic circuitry that energizes and de-energizes electric coils (windings) in the motor in order to make the rotor spin .... A typical brushless DC motor ... is packaged in such a way that only two terminals are accessible: a positive power supply terminal VS and a ground terminal GND (also referred to as a positive and a negative rail, respectively). A third terminal which provides a signal that indicates the speed of the motor is sometimes accessible as well .... Another solution involves the use of pulse width modulation (PWM). In a PWM scheme, the power supply to the motor is repetitively turned on and off at a fixed frequency but variable duty cycle. When the power supply signal has a relatively low duty cycle, for example 25 percent (that is, the power supply is on 25 percent of the time and off 75 percent of the time), the motor to turns at a relatively slow speed. Increasing the duty cycle causes the motor to spin faster. Full power is achieved by leaving the power supply signal on at all times, i.e., 100 percent duty cycle ....

In prior art PWM control schemes for brushless DC motors, the power supply signal is usually driven at full power (i.e., not pulsed) for a fixed period of time at start-up, typically in the range of a few milliseconds to a few seconds, to allow the motor to come up to full speed. The power supply signal is then pulse width modulated to operate the motor at the required speed. Since different motors have different start up times, the fixed period of start-up time for prior art PWM motor drives is typically made longer than necessary to assure that it will be long enough for the slowest starting motors. This is inefficient and generates unnecessary noise ....

[Getz et al. disclosed] a start-up sequence for a PWM control .... First, the motor is turned on at full power, i.e., the power supply signal is constantly on (not pulsed). The number of motor poles is determined. This determination can be skipped if the number of poles is already known. [T]he speed of the motor is monitored until it reaches a suitable speed. The motor is then driven with a PWM power supply signal. One method for determining when the motor has reached a suitable speed ... is to count the number of tachometer edges from a tachometer signal. Since a given motor typically takes a certain number of rotations to come up to speed, this provides a rough approximation of the motor speed. A more sophisticated technique for determining when the motor has reached a suitable speed ... is to measure the time between tachometer edges. Since the number of poles is known, the motor speed can be accurately calculated based on the time between tachometer edges. [T]his method ... optimizes the start-up time. That is, the power supply signal is switched from constant-on to PWM operation just as soon as the motor reaches a suitable speed. [T]achometer edge or pulse refers not only an edge or pulse in a position signal from an actual tachometer, but also more generally to anything that signifies events relating to the position of the rotor. Thus, if the current monitoring scheme described above is utilized instead of a Hall-effect tachometer, instants of minimum torque would essentially be considered tachometer edges.

[Once the motor of the brushless DC motor has started] a top trace ... indicates the physical rotation of the motor where O1 indicates the amount of time the motor takes for a first rotation, O2 is for the second rotation, etc. The second trace indicates the undisturbed tachometer signal which provides position and velocity information. The third trace illustrates the PWM power supply signal driving the motor. A and C indicate on times, whereas B and D indicate off times. Th[is] example ... is for a six-pole (three phase) motor (i.e., six "on" times per revolution). The bottom trace illustrates the actual tachometer output signal from the motor, taking into account the fact that the power supply signal to the motor is being switched on and off to control the speed. The actual tachometer output signal is used to determine the amount of time it takes the motor to complete one rotation.

The normal on time $A_1$ and normal off time $B_1$ for the first rotation are calculated as follows: $O1/P = A_1 + B_1$ where P is the number of poles in the motor. The duty cycle determines the relationship between A and B: $A_1 = DC(A_1 + B_1)$ $B_1 = (1-DC)(A_1 + B_1)$ where DC is the duty cycle (percentage on time).

During the second rotation (.PHI.2), the PWM power supply signal is turned on during times $A_1$ and off during times $B_1$. At the end of the last "on" time $A_1$, the power supply signal is turned off for a shortened "off" time $D_2$, and then turned on for an indeterminate amount of time until a tachometer edge is detected, and then for an additional amount of time equal to $A_1$. As a result, "on" time $C_2$ is longer than $A_1$. By turning the power supply signal on slightly earlier than needed during the last tachometer cycle, it assures that power to the motor will be switched on before the tachometer edge marking the end of the complete rotation. This assures that the entire PWM power supply signal can be resynchronized at the end of each rotation. The "D" off times should be shorter than the "B" off times by as little as possible while still allowing an adequate margin to accommodate changing rotational speeds. Using D=0.75B has been found to provide reliable results. The resynchronization can be accomplished with suitable position sensing technique such as the current monitoring scheme described above.

The motor speed is controlled by varying the duty cycle DC. After a complete revolution is completed, the duty cycle is updated, and the on and off times for the next revolution are recalculated.

The methods described herein can be used with brushless DC motors having any number of poles, and not all poles need be utilized. That is, the motor can be driven by using fewer than all of the poles. For example, ... the motor can be driven using only phase a and leaving phase b off .... This can be helpful in applications where high resolution is required at the low end of the operating range.

The use of Hall-effect transistors to activate and monitor the rotation of a motor is ineffective for numerous reasons. A principal reason is a hall-effect transistor has no conversion from alternating current to direct current. That lack of conversion inhibits the possibility of maintaining a constant high voltage in the armature windings.

The current invention uses a different and more efficient method to turn on and off currents on a brushless motor.

SUMMARY OF THE INVENTION

A motor having an alternating current electrical source, a light power circuitry, a stationary transcutaneous energy transmission coil spaced from a rotatable transcutaneous energy transmission coil, a plurality of phototransistor arrays positioned on a rotatable platform and each phototransistor array corresponds to and rotates in conjunction with an armature winding used in the motor. Each phototransistor array (i) receives an alternating current from the rotatable transcutaneous energy transmission coil, and (ii) charges (a) each armature winding to a constant high voltage when the motor is operating and (b) each phototransistor/MOSFET power source to a desired power level. When the light from the light power circuitry contacts a phototransmitter, the phototransistor array is turned on so the armature winding associated with that phototransmitter generates an instantaneous maximum magnetic field.

DETAILED DESCRIPTION OF THE INVENTION

Figure 1:
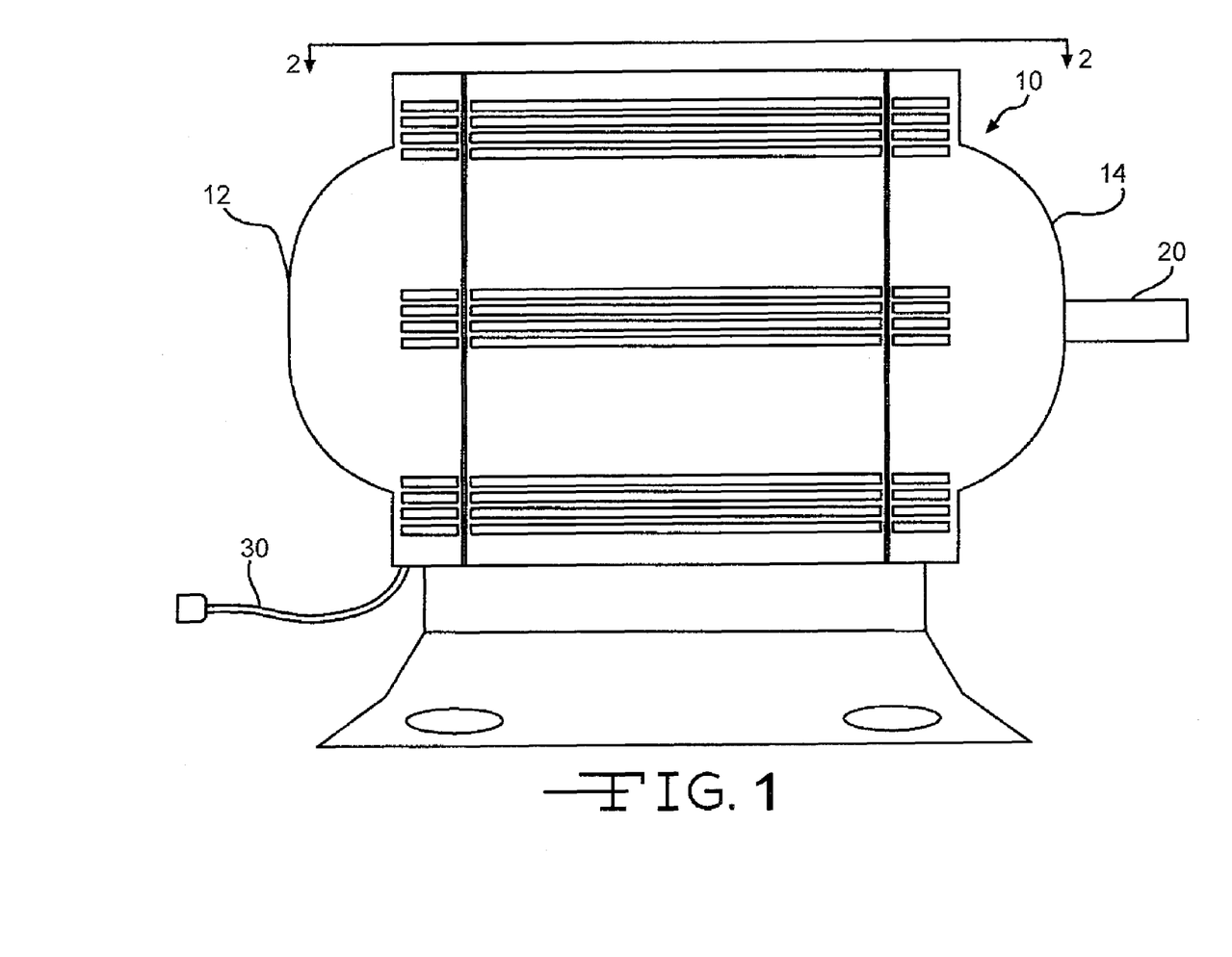
FIG. 1 illustrates motor's casing.

FIG. 1 illustrates standard motor casing 10 having a proximal end 12 and a distal end 14. A standard motor shaft 20 protrudes from the distal end 14 and a standard power supply provider 30, for example through a standard electrical cord, enters the proximal end 12. The power supply provider 30 interconnects to a conventional power supply, for example and not limited to 120 VAC power source.

Figure 2:
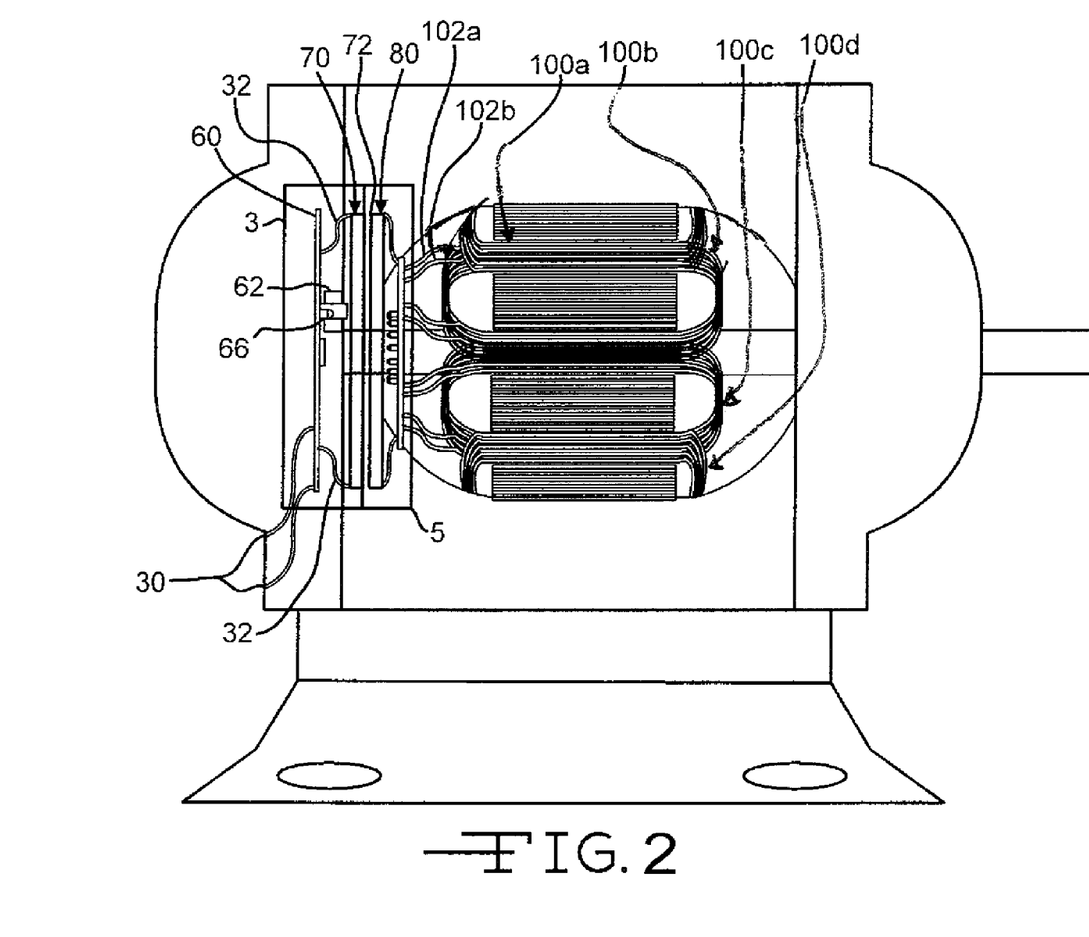
FIG. 2 illustrates a cross-section of FIG. 1 taken along the lines 2-2.
Figure 4:
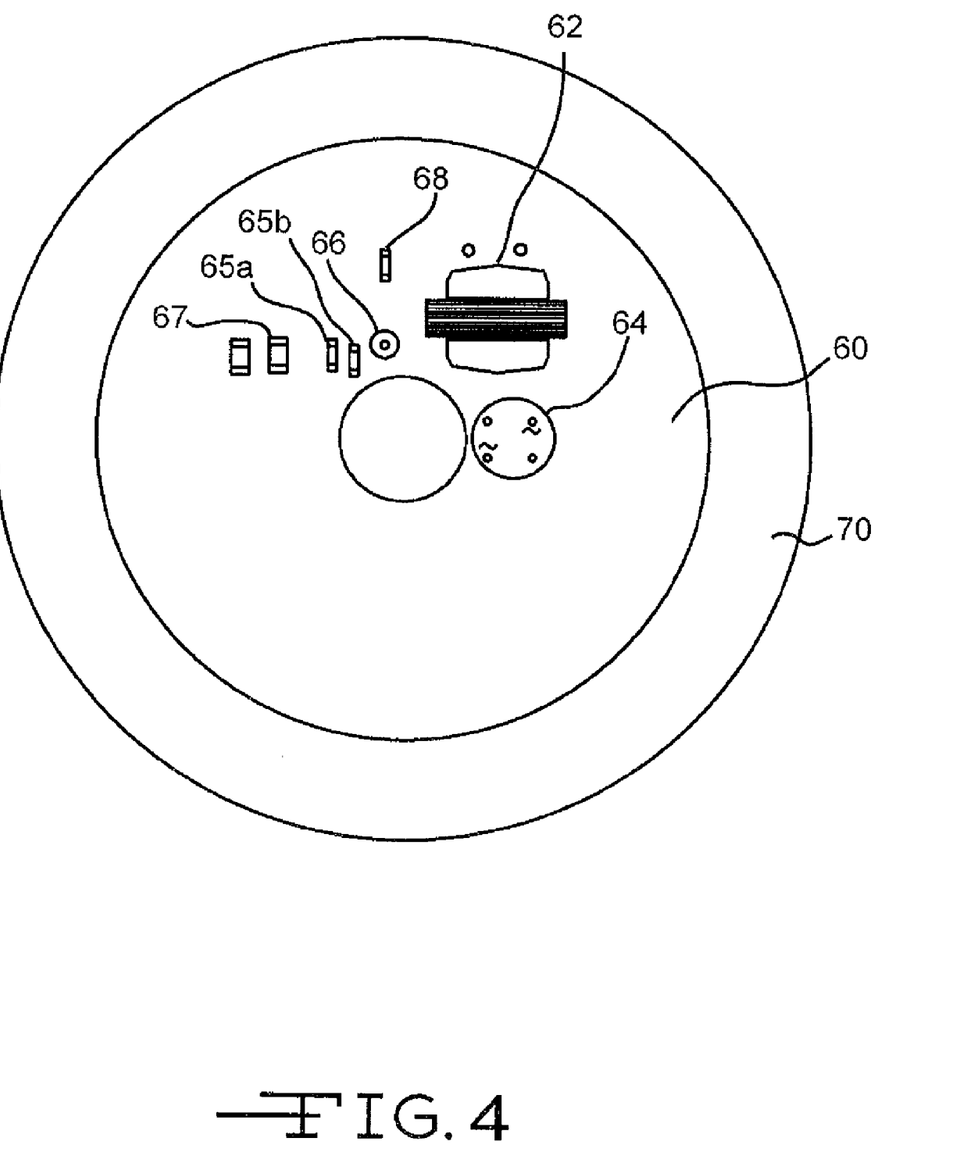
FIG. 4 is a view of FIG. 3 taken along the lines 4-4.
Figure 7:
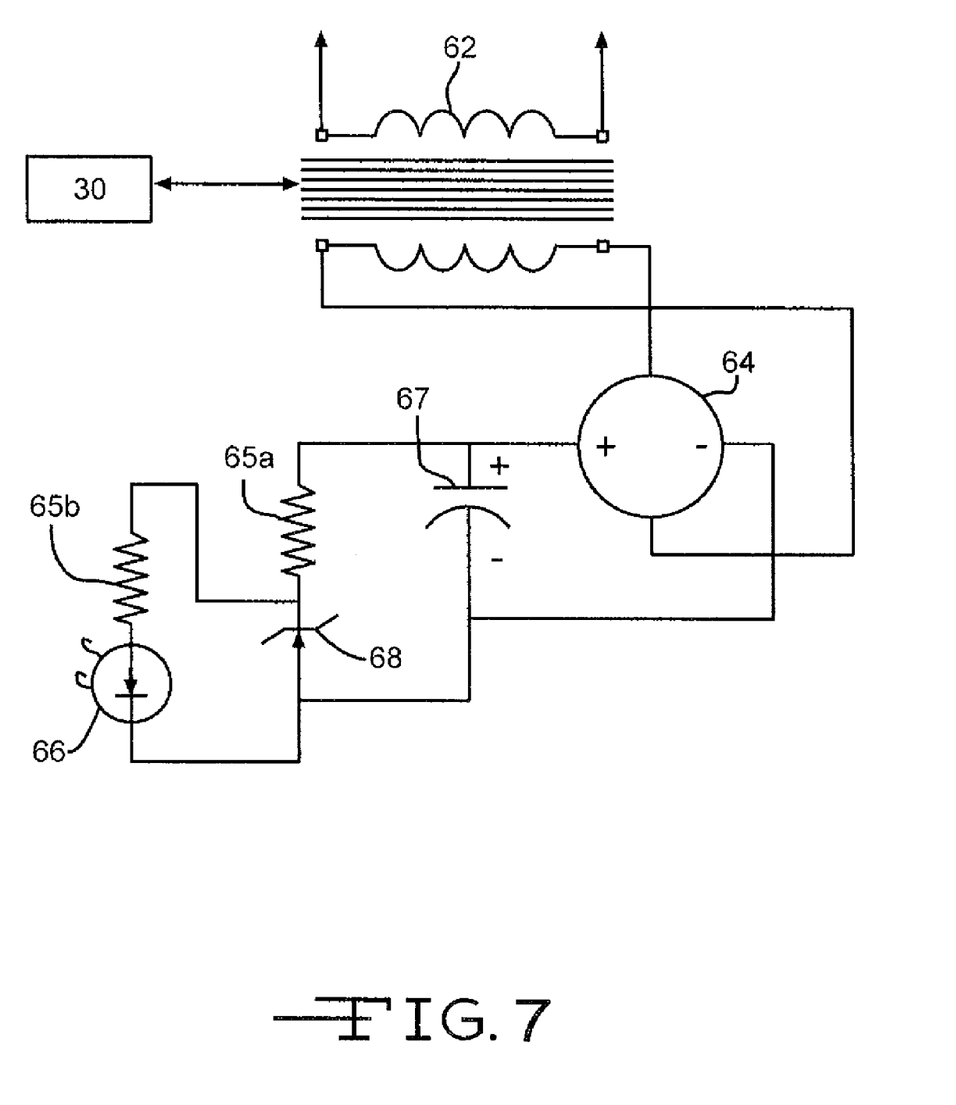
FIG. 7 illustrates an electrical schematic of FIG. 4.

Turning to FIGS. 2, 4 and 7, power supply provider 30 directs alternating current (ac) power to a transformer 62 positioned on a photo-emitter platform 60, shaped like a wheel or an-open-holed doughnut. The transformer 62 is a conventional step down transformer (for example 18 volts) and transmits an electrical signal to a conventional full-wave bridge 64. The full-wave bridge 64 converts the ac signal to a direct current. The direct current is directed to a light emitting diode 66, through a plurality of conventional resistors 65a, 65b, a standard capacitor 67 and at least one zener diode 68, preferably a zener diode of 5 volts or equivalents thereof, to regulate the light transmission so it is constant and reliable. Preferably, the light emitting diode is set at 1.8 volts or equivalents thereof.

Figure 3:
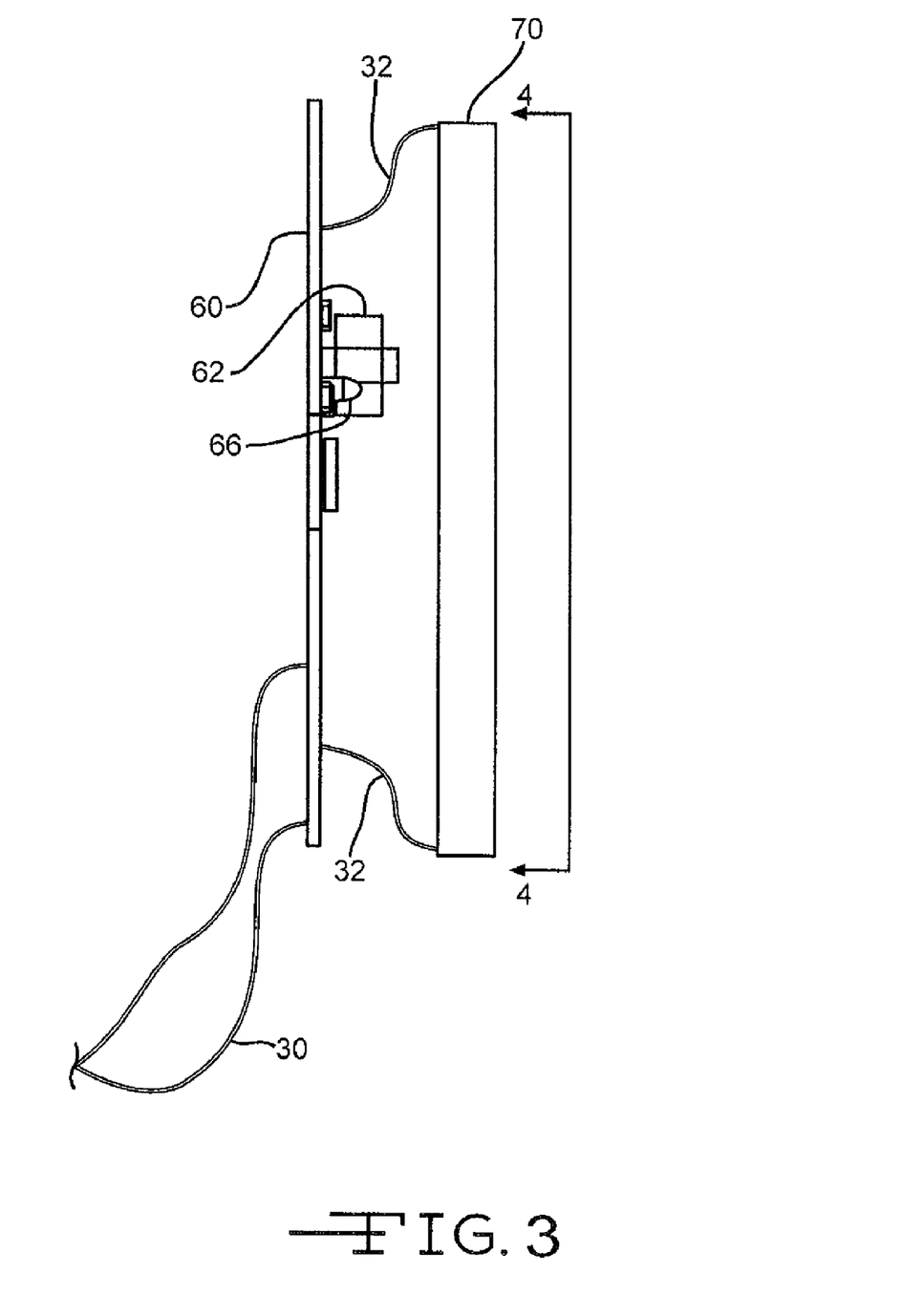
FIG. 3 is an enlarged view of box 3 in FIG. 2.

The photo-emitter platform 60 is stationary and mounted in the motor housing, preferably near the proximal end 12, as illustrated at FIG. 1, when there is only one platform. The power source, from power provider 30, interconnects, through electrical lines 32 extending from the photo-emitter platform 60, to a corresponding primary stationary coil 70 as illustrated in FIGS. 2 and 3. The primary stationary coil 70 also receives the alternating current.

The primary stationary coil 70 is spaced a predetermined distance 72 from a secondary, rotatable, coil 80. That predetermined distance allows the alternating current in the primary stationary coil 70 to pass to the secondary, rotatable, coil 80. The secondary, rotatable, coil rotates at the speed of the motor shaft 20 and the armature windings 100. The secondary, rotatable, coil 80 and primary stationary coils 70 have apertures (not shown) that allow light transmitted by the light emitting diode 66 to contact a photo-receiver 92 positioned on a photo-receiver wheel 90.

Figure 5:
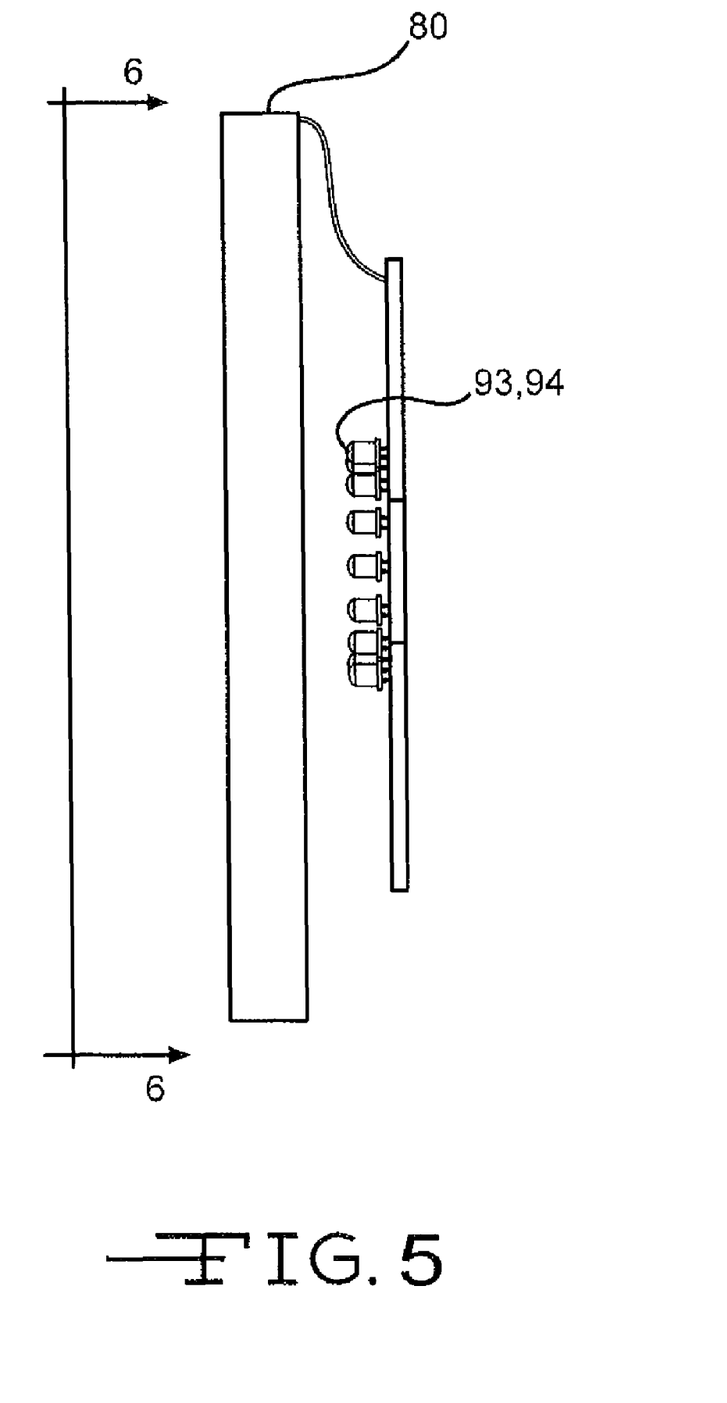
FIG. 5 is an enlarged view of box 5 in FIG. 2.
Figure 6:
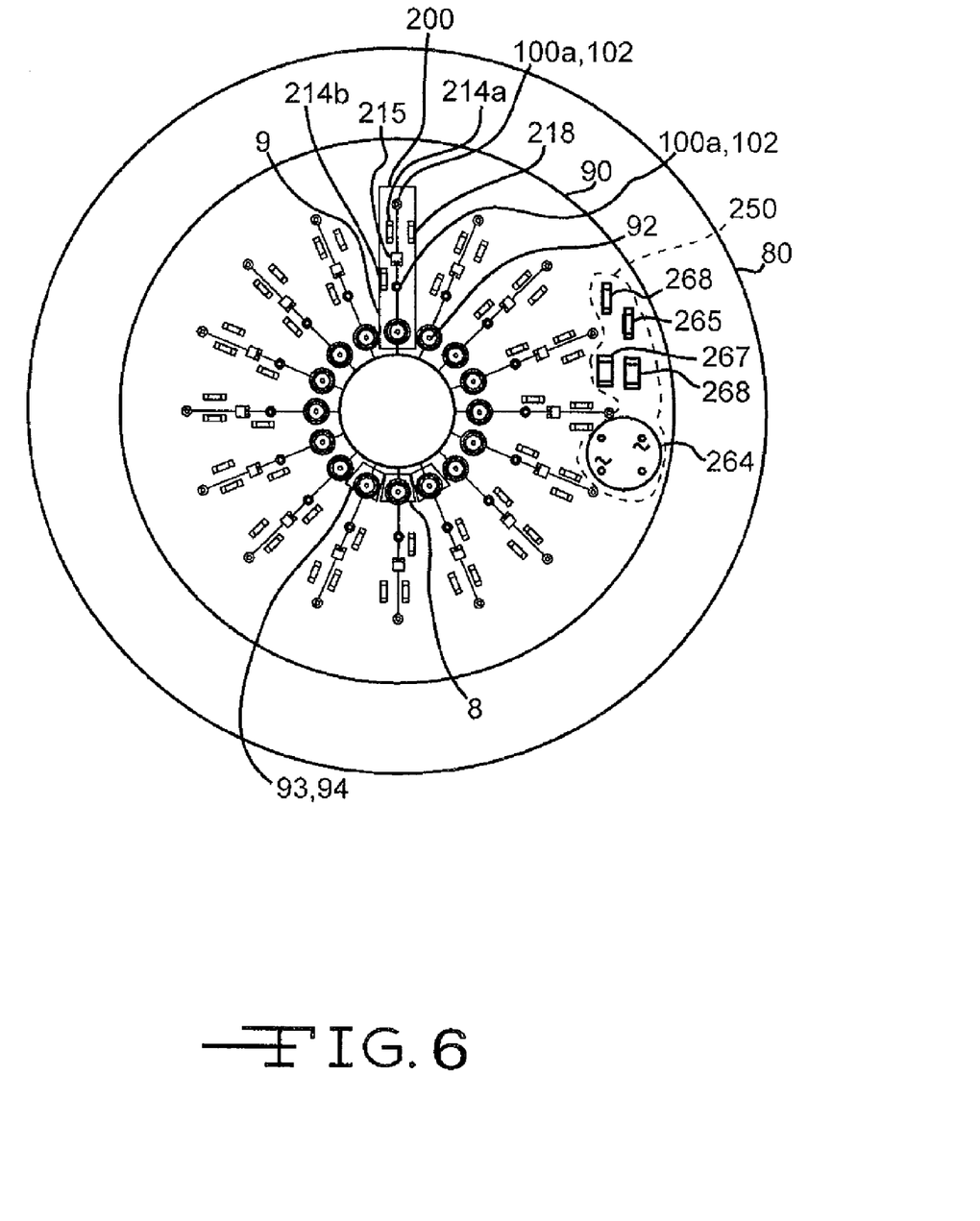
FIG. 6 is a view of FIG. 5 taken along the lines 6-6.

The photo-receiver wheel 90 rotates in conjunction with the motor shaft 20 and the armature windings 100. The photo-receiver wheel 90 has a plurality of photo-receivers 92 as illustrated at FIGS. 5 and 6. Each photo-receiver 92 corresponds to an armature winding 100 surrounding the motor shaft 20. Each armature winding 100 is a conventional armature winding that can create a magnetic field in association with the surrounding armature windings and field armatures. That means if there are sixteen armature windings, then there are sixteen photo-receivers 92. The prior example of sixteen armature windings is merely an example, there must be at least two (2) armature windings for the present invention. In addition, each photo-receiver 92 has the same radius distance and that radius corresponds to the position of the light emitting diode 66. Hence the light from the light emitting diode 66 and the light emitting diode 66 can be positioned directly in front of each photo-receiver 92 as the photo-receiver 90 rotates.

Figure 8A:
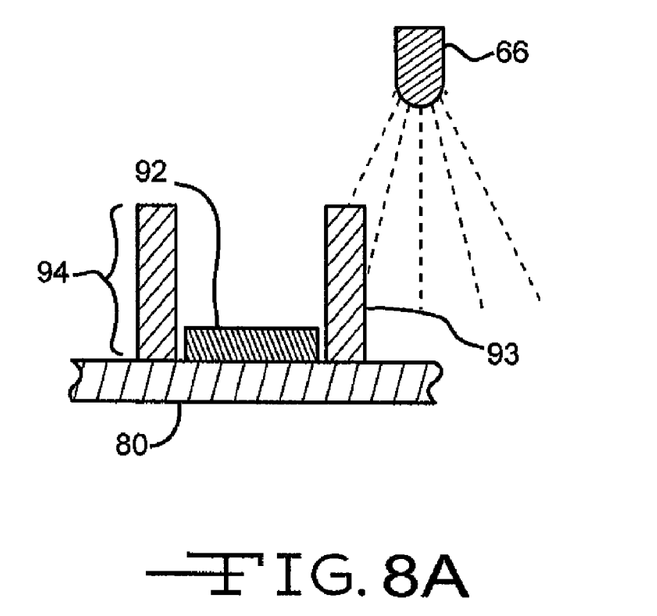
FIGS. 8a and 8b are enlarged cross-sectional views of box 8 in FIG. 6 at different points when the phototransistor is directly in front of the light diode illustrated in FIG. 7.
Figure 8B:
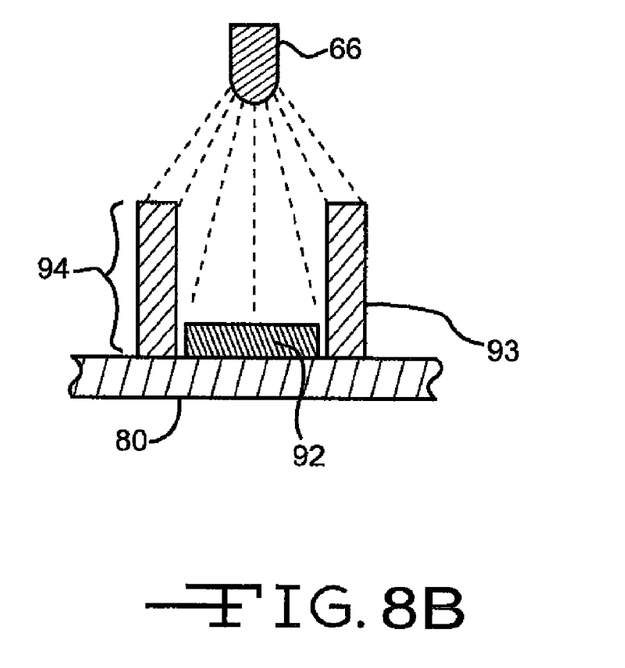

To inhibit a photo-receiver 92 from receiving stray light from the light emitting diode 66 when the LED 66 is not positioned directly in front of the respective photo-receiver 92 (see FIG. 8a), each photo-receiver 92 is within a light shield 93. Each light shield 93, as illustrated in FIGS. 8a and b, has a wall 94. The wall 94 has a height that permits each photo-receiver 92 to receive light from the light emitting diode 66 only when the light emitting diode 66 is positioned directly in front of the respective photo-receiver 92 (see FIG. 8b). Likewise, the light emitting diode 66 can also be surrounded by a light shield to ensure the light is focused in a particular direction.

Figure 9:
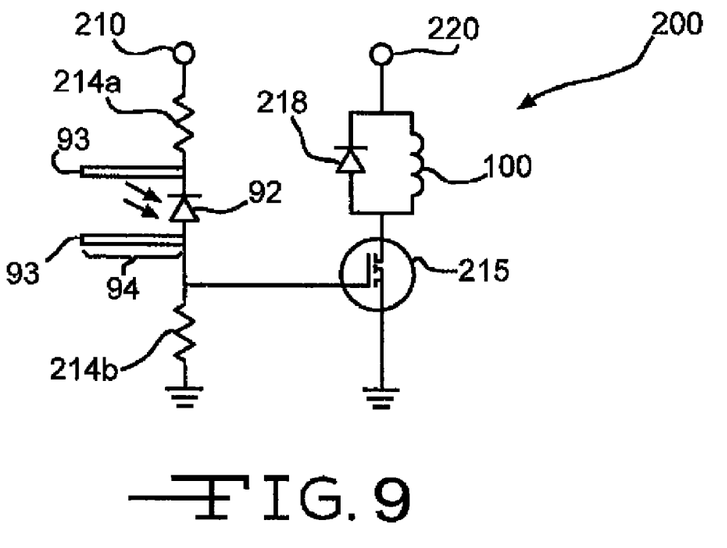
FIG. 9 illustrates an electrical schematic of box 9 in FIG. 6.

When the light emitting diode 66, which is stationary, is positioned directly in front of the respective photo-receiver 92 (which moves), the photo-receiver 92, as illustrated in FIG. 9, activates an electrical circuitry 200 that interconnects the photo-receiver 92 to the respective armature winding 100, through electrical lines 102. Likewise, when the light emitting diode 66 is not positioned directly in front of the respective photo-receiver 92, the photo-receiver 92 de-activates the electrical circuitry 200 that interconnects the photo-receiver 92 to the respective armature winding 100.

The precision to turn on and off the electrical circuitry 200 associated with each photo-receiver 92 is critical to the current invention. That precision is accomplished by the use of the single, stationary light emitting diode 66 in conjunction with the rotated plurality of photo-receivers 92 wherein each photo-receiver is within its respective light shield 93.

Once the electrical circuitry is turned on, the respective photo-receiver 92 connects a low wattage, low heat power source 210 to a low resistance, conventional MOSFET 215, through various resistors 214a, b to obtain and desired voltage. The power source 210 transmits, when the photo-receiver 92 is on, the low voltage to the MOSFET 215 and activates the MOSFET. Once the MOSFET 215 is activated, the photo-receiver's respective armature winding power 220, which is at constant high voltage, activates the respective armature winding 100(a-d [and more if desired]), to maximum current capabilities and to obtain maximum magnetic field to generate the desired power.

Figure 10:
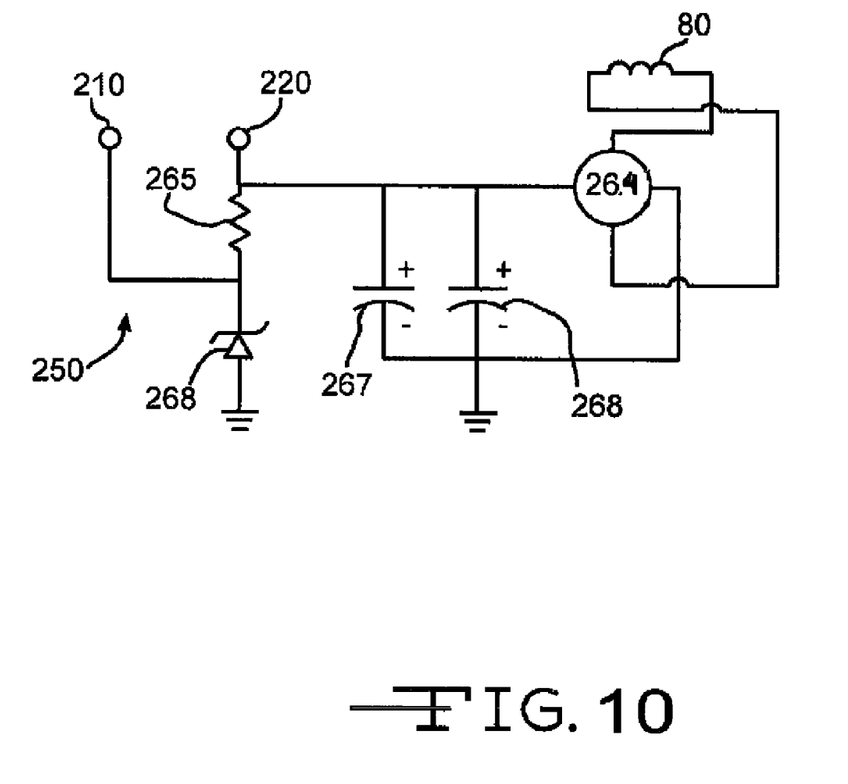
FIG. 10 illustrates an electrical schematic of FIG. 6.

The respective direct current for both the armature winding power 220 and the low wattage, low heat power source 210 is obtained through a secondary electrical circuitry 250, as illustrated in FIG. 10. In the secondary electrical circuitry, the secondary, rotatable, coil's 80 alternating current, received from the first stationary coil 70, is converted into a desired direct current voltage to (a) the armature winding power 220 through a second conventional full wave bridge 264, and a plurality of capacitors 267, 268, and (b) the low wattage, low heat power source 210 through a second conventional full wave bridge 264, a plurality of capacitors 267, 268 and resistor 265 used in conjunction with a zener diode 268.

Figure 11:
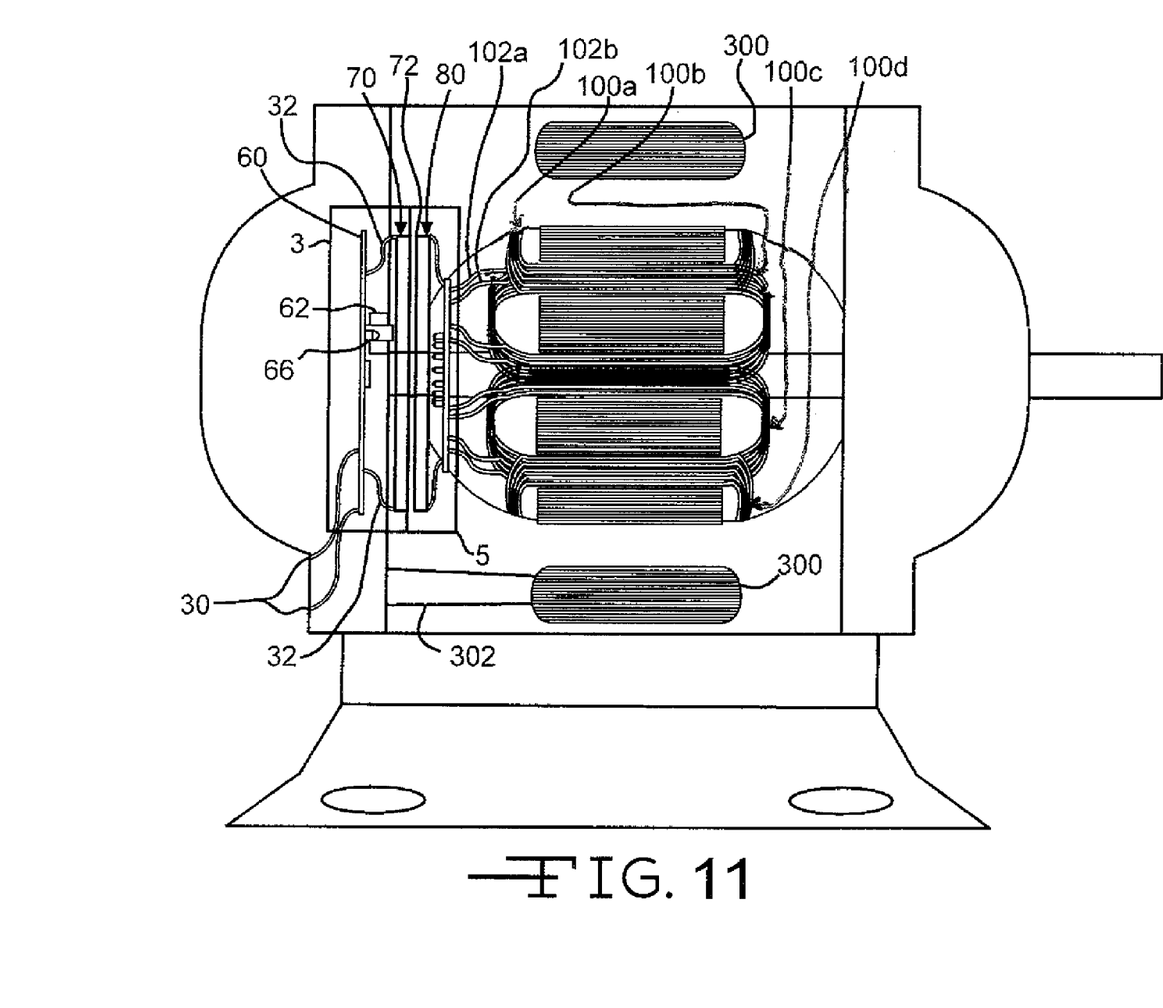
FIG. 11 is an alternative embodiment of FIG. 2.

Alternatively, the first stationary coil 70 can also receive additional alternating current from field windings 300 positioned in the casing 10, as illustrated in FIG. 11. Each field winding 300 interconnects to the first primary stationary coils 70 through electrical lines 302. That additional alternating current is incorporated into the current invention as described above.

Alternatively, the light emitting diode 66 can be substituted with a conventional laser.

To phrase the instant invention in alternative language, this electric motor system 10 is for a high torque electric motor; and has a field winding 300, armature windings 100, a phototransistor array 200, one LED or LASER 66, and two transcutaneous energy transmission (TET) (aka, primary stationary coil 70 and secondary, rotatable, coil 80) coils; wherein for monitoring motor speed there is the LED 66 and the phototransistor 92 that detect revolutions per minute. This motor 10 has no brushes. In place of brushes, phototransistors, MOSFET devices 215 and LED or HeNe LASER 66 are used. Transferring the energy in to the armature winding is accomplished by using a transcutaneous energy transmission (TET) system 70, 80. This system eliminates the interface between brushes and a commutator used in conventional motor systems, and eliminates the dust from the brush material. A brush motor is limited in speed because the brush interface. This new system will allow the motor to run smoother, faster and more efficient with lower maintenance and longer life span.

The field winding 300, which can be in series, will have an option for different frequencies. The different frequencies can range from 30 Hz to 600 Hz depending on the desired requirements, workload, and duty cycle. The frequency will enter the winding through hard connections 302.

There will a number of armature windings 100 depending on the size and requirements of the motor 10. Connected to each winding 100 there will be phototransistor 92 and a MOSFET device 215. Each respective phototransistor 92 and the MOSFET device 215 will apply energy to the respective armature winding 100 as the armature rotates. The armature winding 100 will have a suppression diode 218 across each winding. The suppression diode 218 suppresses any back electromagnetic force energy. The back electromagnetic force energy occurs when the field energy is turned off and the field collapses and goes in reverse, which could be called negative energy or minus energy.

In the center of the armature winding, there will a full wave bridge 264 and a ceramic capacitor 267, 268 to filter the cycles. The TET coils 70, 80 connect to the input of a full wave bridge 264; the capacitor 267,268 connects to the top of each armature winding 100, at the bottom of each winding 100 there will be the phototransistor 92 and MOSFET device 215 that will turn the winding on and off as the armature 100 rotates. This on/off capability occurs every time the phototransistor 92 rotates passes the LED 66.

The phototransistor array 200 is arranged in a doughnut shape, located on the armature. When the armature winding rotates, the phototransistor 200, 92 rotates with the armature 100 causing a spinning action. The second rotating TET 80—there can be two rotating TET coils one near the proximal end 12 and the other near the distal end 14—is also mounted on the armature winding and will rotate with the armature winding.

At least one stationary TET coil 70 will be mounted in the motor housing—there can be two stationary TET coils 70 one near the proximal end 12v and the other near the distal end 14, if there are two corresponding rotating TET coils 80. The stationary TET coil 70 and the rotating TET coil 80 are extremely close to each other. For example, the distance 72 between the stationary TET coil and the rotating TET coil can be within 10 thousandths of an inch; or equivalents thereof so long as the current transfers from one coil to the other coil at desired levels. These coils allow energy to transfer from the coils in the motor housing to the coils located on the armature. That energy will supply energy to the full wave bridge assembly 264.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A motor comprising:
an alternating current electrical source;
a light power circuitry that receives and converts the alternating current into a direct current and directs the direct current to a device that emits light from a specific, non-moving location;
a stationary transcutaneous energy transmission coil receives the alternating current and transmits, across a gap, the alternating current to a rotatable transcutaneous energy transmission coil;
a plurality of phototransistor arrays positioned on a rotatable platform and each phototransistor array corresponds to and rotates in conjunction with an armature winding used in the motor;
each phototransistor array has a phototransistor and a MOSFET device, and each phototransistor array (i) receives the alternating current from the rotatable transcutaneous energy transmission coil, and (ii) allows (a) each armature winding to charge to a constant high voltage when the motor is operating and (b) each phototransistor/MOSFET power source to charge to a desired power level;
each phototransistor is surrounded by a light shield having a wall, wherein each wall has a height that permits each phototransistor to receive light from the device that emits light only when the light device is positioned directly in front of the phototransistor;
wherein when the light contacts the phototransistor, the phototransistor array associated with that phototransistor is turned on so the armature winding associated with that phototransistor generates an instantaneous maximum magnetic field;
wherein when the light does not contact the phototransistor, the phototransistor array associated with that phototransistor is turned off and the corresponding armature winding is set at a constant high voltage when the motor is operating.

2. The motor of claim 1 wherein the device that emits light is a light emitting diode.

3. The motor of claim 1 wherein the device that emits light is a laser.

4. The motor of claim 1 further comprising a field winding that generates alternating current that is directed to the light power circuitry and the stationary transcutaneous energy transmission coil.

5. The motor of claim 1 further comprising a suppression diode on each armature winding.

6. The motor of claim 1 wherein when the phototransmitter is positioned directly in front of the device that emits light, the phototransistor and the device that emits light are in the same horizontal plane relative to the motor.

* * * * *